United States Patent
Zhang et al.

(10) Patent No.: US 11,071,088 B2
(45) Date of Patent: Jul. 20, 2021

(54) NETWORK SLICE-SPECIFIC PAGING FOR WIRELESS NETWORKS

(71) Applicant: Nokia Solutions and Networks Oy, Espoo (FI)

(72) Inventors: Yanji Zhang, Shanghai (CN); Yuantao Zhang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/629,628

(22) PCT Filed: Aug. 7, 2017

(86) PCT No.: PCT/CN2017/096208
§ 371 (c)(1),
(2) Date: Jan. 9, 2020

(87) PCT Pub. No.: WO2019/028589
PCT Pub. Date: Feb. 14, 2019

(65) Prior Publication Data
US 2021/0144674 A1 May 13, 2021

(51) Int. Cl.
*H04W 68/02* (2009.01)
*H04W 72/04* (2009.01)

(52) U.S. Cl.
CPC ......... *H04W 68/02* (2013.01); *H04W 72/042* (2013.01)

(58) Field of Classification Search
CPC ............................ H04W 68/02; H04W 72/042
USPC ....................................................... 455/458
See application file for complete search history.

(56) References Cited

U.S. PATENT DOCUMENTS

| | | | |
|---|---|---|---|
| 2009/0239555 A1* | 9/2009 | Sim | H04W 4/029 455/458 |
| 2014/0153530 A1* | 6/2014 | Iwai | H04W 68/02 370/329 |
| 2015/0103768 A1* | 4/2015 | Chen | H04W 72/1278 370/329 |

FOREIGN PATENT DOCUMENTS

| | | |
|---|---|---|
| CN | 106851589 A | 6/2017 |
| CN | 106941734 A | 7/2017 |
| EP | 3340703 A1 | 6/2018 |
| WO | WO-2017/034194 A1 | 3/2017 |

(Continued)

OTHER PUBLICATIONS

CMCC; "Control Plane functions in NR"; R2-163718; 3GPP TSG-RAN WG2 Meeting #94, Nanjing, China; May 23-27, 2016; 4 pages (section 2.2).

(Continued)

*Primary Examiner* — Joel Ajayi
(74) *Attorney, Agent, or Firm* — Harrington & Smith

(57) ABSTRACT

A technique includes receiving, by a first user device within a wireless network, an indication that the wireless network supports slice-specific grouped paging for at least a first slice-specific paging group, wherein the first user device is a member of the first slice-specific paging group; decoding, by the first user device, a received downlink control information that has been directed to the first slice-specific paging group to obtain scheduling information for a paging message for the first slice-specific paging group; receiving, by the first user device from the base station based on the scheduling information, the paging message for the first slice-specific paging group; and receiving, by the first user device, data based on the paging message.

15 Claims, 8 Drawing Sheets

(56) References Cited

FOREIGN PATENT DOCUMENTS

WO    WO 2017/125025 A1    7/2017

OTHER PUBLICATIONS

3GPP TR 38.801 V1.2.0 (Feb. 2017), "3rd Generation Partnership Project; Technical specification Group Radio Access Network; Study on New Radio Access Technology; Radio Access Architecture and Interfaces (Release 14)", Section 8.2.2 Solution 2, 4 pgs.

* cited by examiner

NETWORK SLICE-SPECIFIC PAGING FOR WIRELESS NETWORKS

CROSS REFERENCE TO RELATED APPLICATION

This patent application is a U.S. National Stage application of International Patent Application Number PCT/CN2017/096208 filed Aug. 7, 2017, which is hereby incorporated by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, above 6 GHz. For fifth generation wireless systems (5G), an access architecture for deployment of cellular radio equipment employing mmWave radio spectrum has been proposed. Other example spectrums may also be used, such as cmWave radio spectrum (3-30 GHz).

In addition, 5G wireless networks may support network slicing, wherein a single physical network may be sliced into multiple virtual networks. Each network slice may include a set of logical network functions that may support the requirements of a particular use case.

SUMMARY

According to an example implementation, a method comprising: receiving, by a first user device within a wireless network, an indication that slice-specific grouped paging is supported for at least a first slice-specific paging group, wherein the first user device is a member of the first slice-specific paging group; decoding, by the first user device, a received downlink control information that has been directed to the first slice-specific paging group to obtain scheduling information for a paging message for the first slice-specific paging group; receiving, by the first user device from the base station based on the scheduling information, the paging message for the first slice-specific paging group; and receiving, by the first user device, data based on the paging message.

According to an example implementation, an apparatus includes at least one processor and at least one memory including computer instructions that, when executed by the at least one processor, cause the apparatus to: receive, by a first user device within a wireless network, an indication that slice-specific grouped paging is supported for at least a first slice-specific paging group, wherein the first user device is a member of the first slice-specific paging group; decode, by the first user device, a received downlink control information that has been directed to the first slice-specific paging group to obtain scheduling information for a paging message for the first slice-specific paging group; receive, by the first user device from the base station based on the scheduling information, the paging message for the first slice-specific paging group; and receive, by the first user device, data based on the paging message.

According to an example implementation, a computer program product includes a computer-readable storage medium and storing executable code that, when executed by at least one data processing apparatus, is configured to cause the at least one data processing apparatus to perform a method including: receiving, by a first user device within a wireless network, an indication that slice-specific grouped paging is supported for at least a first slice-specific paging group, wherein the first user device is a member of the first slice-specific paging group; decoding, by the first user device, a received downlink control information that has been directed to the first slice-specific paging group to obtain scheduling information for a paging message for the first slice-specific paging group; receiving, by the first user device from the base station based on the scheduling information, the paging message for the first slice-specific paging group; and receiving, by the first user device, data based on the paging message.

According to an example implementation, a method comprising: transmitting, by a base station within a wireless network, a downlink control information directed to a first slice-specific paging group, the downlink control information including scheduling information for a paging message for the first slice-specific paging group; transmitting, by the base station based on the scheduling information, the paging message for the first slice-specific paging group; and transmitting, by the base station to at least a first user device that is a member of the first slice-specific paging group, data based on the paging message.

According to an example implementation, an apparatus includes at least one processor and at least one memory including computer instructions that, when executed by the at least one processor, cause the apparatus to: transmit, by a base station within a wireless network, a downlink control information directed to a first slice-specific paging group, the downlink control information including scheduling information for a paging message for the first slice-specific paging group; transmit, by the base station based on the scheduling information, the paging message for the first slice-specific paging group; and transmit, by the base station to at least a first user device that is a member of the first slice-specific paging group, data based on the paging message.

According to an example implementation, a computer program product includes a computer-readable storage medium and storing executable code that, when executed by at least one data processing apparatus, is configured to cause the at least one data processing apparatus to perform a method including: transmitting, by a base station within a wireless network, a downlink control information directed to a first slice-specific paging group, the downlink control information including scheduling information for a paging message for the first slice-specific paging group; transmitting, by the base station based on the scheduling information, the paging message for the first slice-specific paging group; and transmitting, by the base station to at least a first user device that is a member of the first slice-specific paging group, data based on the paging message.

According to an example implementation, a method comprising: receiving, by a core network entity from a base station that is in communication with a first user device, a setup request including an indication that the base station supports slice-specific grouped paging; and transmitting, by the core network entity to the base station, a setup response including an indication by the core network entity of support for slice-specific grouped paging for at least a first slice-specific paging group, wherein the first user device is a member of the first slice-specific paging group.

According to an example implementation, an apparatus includes at least one processor and at least one memory including computer instructions that, when executed by the at least one processor, cause the apparatus to: receive, by a core network entity from a base station that is in communication with a first user device, a setup request including an indication that the base station supports slice-specific grouped paging; and transmit, by the core network entity to the base station, a setup response including an indication by the core network entity of support for slice-specific grouped paging for at least a first slice-specific paging group, wherein the first user device is a member of the first slice-specific paging group.

According to an example implementation, a computer program product includes a computer-readable storage medium and storing executable code that, when executed by at least one data processing apparatus, is configured to cause the at least one data processing apparatus to perform a method including: receiving, by a core network entity from a base station that is in communication with a first user device, a setup request including an indication that the base station supports slice-specific grouped paging; and transmitting, by the core network entity to the base station, a setup response including an indication by the core network entity of support for slice-specific grouped paging for at least a first slice-specific paging group, wherein the first user device is a member of the first slice-specific paging group.

The details of one or more examples of implementations are set forth in the accompanying drawings and the description below. Other features will be apparent from the description and drawings, and from the claims.

DETAILED DESCRIPTION

Figure 1:
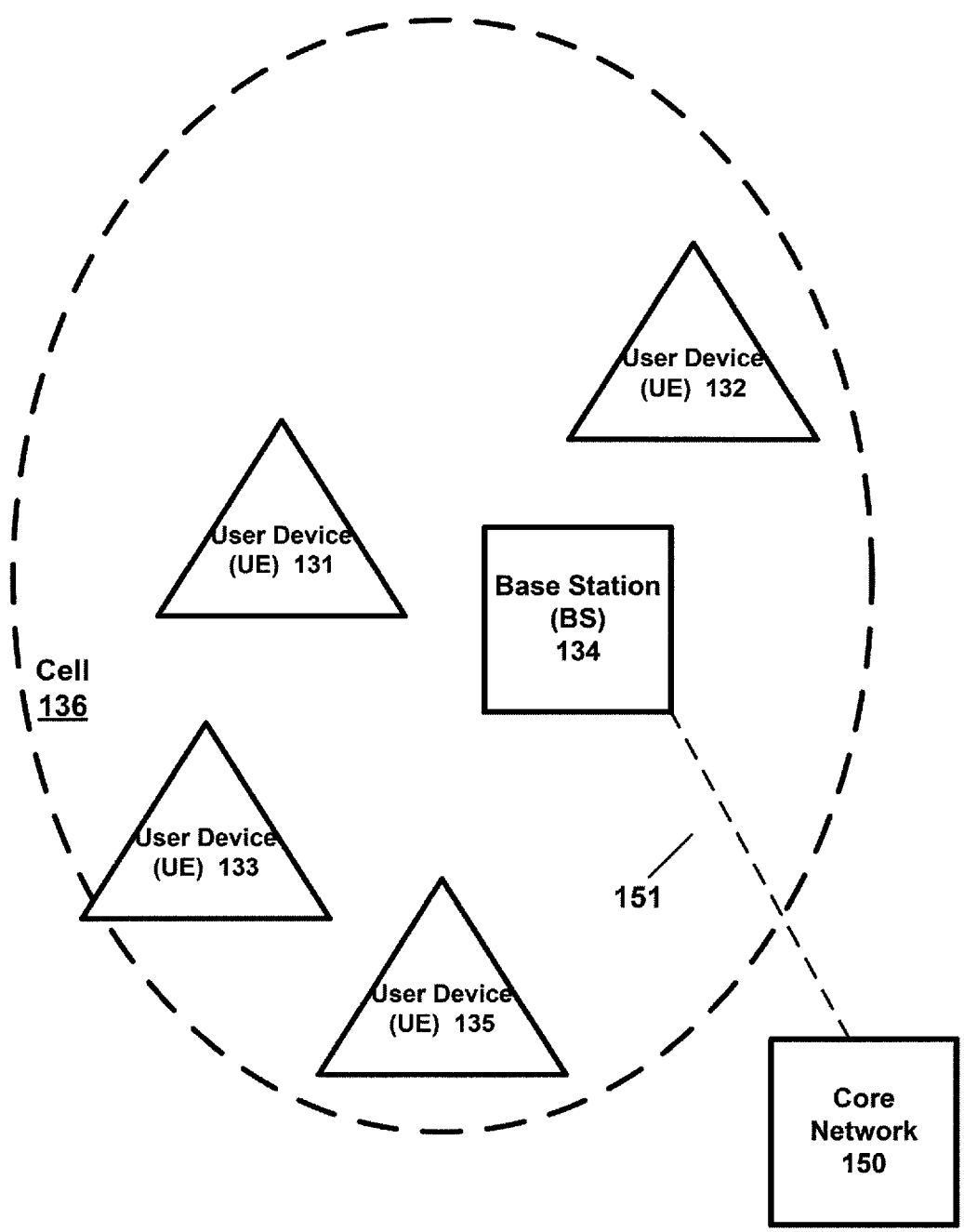
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e) Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), enhanced mobile broadband, massive machine type communications (MMTC), vehicle-to-vehicle (V2V), vehicle-to-device, etc. Each of these use cases, or types of UEs, may have its own set of requirements.

A paging procedure may be used to inform a UE in Idle mode about an incoming call or data that is to be provided or transmitted to the UE. For example, the core network may request a BS to page the UE. The BS may then page the UE by transmitting a paging message. The paging message may include an identifier for the UE (e.g., temporary mobile subscriber identifier (TMSI)) within a paging record provided within the paging message. If the UE detects its identifier within the paging message, then the UE may then initiate a service request with the network (NW) to obtain the data, which may, for example, include performing random access with the BS, establishing a connection with the NW, and then receiving the data from the NW. In an example implementation, the network (NW) may include the core network (or one or more core network entities) and/or the BS (which is part of the radio access network or RAN).

However, with a large number of devices or UEs (e.g., IoT UEs, MMTC UEs, URLLC UEs, . . . ) within a 5G wireless network, this may create a large paging overhead for the BS, at least in some cases.

In addition, 5G wireless networks may support network slicing, wherein a single physical network may be sliced into multiple virtual networks. Each network slice may include a set of logical network functions that may support the requirements of a particular use case. Network Slicing may allow differentiated treatment depending on requirements of different UEs or groups of UEs. With slicing (network slicing), an operator can create networks for optimized solutions based on different service requirements, QoS (quality of service), functionality, performance, etc.

According to an example implementation, a group of UEs, e.g., with similar QoS requirements or running the same or similar application, providing a common feature or functionality, or other common aspect, may support a network slice and a network slice identifier (or slice ID) may be allocated to or associated with a network slice. However, each different group of UEs may have different service requirements. According to an example implementation, each of multiple groups of UEs may be assigned to a different network slice. In addition, each group of UEs (assigned to a different network slice) may have different paging requirements. For example, mMTC (massive machine-type communications) devices may only need a small amount of data transmission, but may demand a very efficient handling of UE power consumption and control signaling. Other groups of UEs or different types of UEs, which may be allocated to a different slice, may require different services and/or may require different paging services. Moreover, different data may be transmitted from a core network to UEs or groups of UEs that are assigned to different slices.

Therefore, according to an example implementation, slice-specific grouped paging may be supported or provided, e.g., in which one or more slice-specific paging groups may be provided, wherein each slice-specific paging group (or UEs for this group) may be paged separately from other slice-specific paging groups. For example, each slice-specific paging group may be associated with, identified by, or assigned to a different slice-specific paging group identifier (e.g., such as a slice paging radio network temporary identifier (S-P-RNTI)). Thus, for example, slice-specific grouped paging may be provided via the use of a different slice-specific paging group identifier (e.g., S-P-RNTI) for each slice-specific paging group, for example. For example, a group of UEs may be allocated to a network slice, and slice-specific grouped paging may be supported by the core network, a BS and one or more UEs of the group. For example, slice-specific grouped paging may be applied for a certain slice (or a slice-specific paging group) that supports the same type of service, and such slice-specific grouped paging may be separate from a common paging by specific P-RNTI (paging RNTI).

According to an example implementation, slice-specific paging groups may be provided for or allocated to different slices, e.g., to separate the various network resources, including physical resource(s), for different services. A slice-specific paging group identifier (e.g., such as a slice paging radio network temporary identifier (S-P-RNTI)) may be associated with or used to identify each slice-specific paging group. And, each slice-specific paging group identifier (e.g., each S-P-RNTI) may be based on or may be derived (or derivable) from (e.g., a subset of bits of) an associated slice identifier (or slice ID) for the slice-specific paging group. According to an example implementation, a slice identifier may be or may include a single Network Slice Selection Assistance Information (S-NSSAI), which may identify a slice. A Network Slice Selection Assistance Information (NSSAI) may include or identify a group or vector of slice identifiers (e.g., may include or identify a group or vector of S-NSSAIs).

According to an example implementation, a registration procedure between a UE and a core network entity (e.g., an Access and Mobility Management Function (AMF) at the core network) may allow a UE to submit a registration request to the core network entity (e.g., including a group of slice identifiers), and the core network entity may provide a registration response that includes a slice identifier (e.g., a S-NSSAI) for each slice that supports slice-specific grouped paging. Also, for example, a BS (gNB) may send a setup request to the core network entity indicating that slice-specific grouped paging is supported by the BS, and the core network entity may reply with a setup response that includes the slice identifiers (e.g., one or more S-NSSAIs) of slices that support the slice-specific grouped paging. Thus, for example, a BS/gNB may inform a core network entity (e.g., AMF) whether to support such slice specific paging (e.g., slice-specific grouped paging), and the core network entity/ AMF may provide the BS/gNB the paging assistance information in a core network paging message including the S-NSSAI (one or more slice IDs) and the capability of UE to support the slice specific paging for these one or more network slices. Thus, for example, the paging assistance information may include a slice identifier (e.g., S-NSSAI) associated with a service that triggered a paging procedure.

For example, a UE may be a member of a first slice-specific paging group, which may be identified by or associated with a first slice-specific paging group identifier (e.g., a first S-P-RNTI). A BS may transmit downlink control information on a physical downlink control channel (PDCCH), where the downlink control information is directed to the first slice-specific paging group (including to the UE, which is a member of the first slice-specific paging group). For example, the downlink control information may be directed to the first slice-specific paging group by scrambling the downlink control information, or a portion thereof, with (or based on) the first slice-specific paging group identifier (e.g., scrambled based on the first S-P-RNTI). The UE may decode and descramble the downlink control information using the known first slice-specific paging group identifier (e.g., the first S-P-RNTI) that is associated with or used to identify the first slice-specific paging group. The downlink control information received by the UE may include, e.g., scheduling information for a paging message to be transmitted via a physical downlink shared channel (or data channel) (e.g., PDSCH). The UE may then receive the paging message based on the scheduling information. The UE may then receive the data based on the paging message. As described in greater detail below, there are two example techniques for a UE to receive data via a paging message. Each of these different techniques may be associated with a different paging message format.

Thus, according to an example implementation, two different paging message formats may be used. Information (e.g., a control bit or flag) may be included within the downlink control information that may indicate or identify the format of the paging message as either 1) a paging message format in which the paging message includes identities (e.g., TMSIs) of one or more UEs, which are members of the first slice-specific paging group, for which data will be transmitted after a service request procedure, and 2) a paging message format in which the paging message directly includes data that is broadcast to UEs that are members of the first slice-specific paging group.

Thus, according to an example implementation, the UE may receive and decode and descramble the downlink control information using the slice-specific paging group identifier (e.g., S-P-RNTI) for the first slice-specific paging group, of which the UE is a member, to obtain the scheduling information for the paging message, and also to identify a paging message format for the paging message, e.g., based on control information that may be included in the downlink control information that may identify the paging message format.

According to an example implementation, in accordance with the two different paging message formats, there may be two different techniques or implementations that may be used to deliver or transmit data to one or more UEs that are members of a slice-specific paging group, including 1) transmitting or delivering data to a UE after a service request procedure, or 2) directly including the data within the paging message. Further details are described below.

1) According to a first example implementation, a service request procedure may be used by a UE that is a member of the first slice-specific paging group, to obtain the data. The paging message includes a paging record that includes an identifier (e.g., a TMSI) of each UE for which data is to be delivered or transmitted. In response to detecting its UE identifier (e.g., its TMSI) within the paging message, the UE may initiate a service request procedure, e.g., including performing random access with the BS, establishing a connection with the NW, and then receiving the data from the NW. For example, this example implementation for data delivery (which may rely on each UE initiating a service request procedure to obtain the data) may be used, for example, when there may be different (or distinct) data to be delivered to each of a plurality of UEs that are members of the first slice-specific paging group. Paging overhead may be reduced in this example implementation, e.g., via the transmission of one paging message for a group of UEs that are members of the first slice-specific paging group. For example, a BS may receive a plurality of core network paging messages from the core network entity, each core network paging message indicating data for transmission to a UE. The BS may then determine that at least some of these UEs (for which there is data for delivery) are members of a first slice-specific paging group. Thus, in this case, the BS may elect to page these UEs through use of slice-specific grouped paging, e.g., by sending control information directed to the first slice-specific paging group, followed by a paging message.

2) According to a second example implementation, the paging message itself may include the data (e.g., within a field or portion of the paging message) to be delivered or transmitted to the UEs that are members of the first slice-specific paging group. In addition to including the data, the paging message may also include a paging record that includes a UE identifier for each UE that is a member of the first slice-specific paging group and/or information identifying the first slice-specific paging group (such as the first slice-specific paging group identifier, such as a first S-P-RNTI). Thus, in this example implementation, the UE may receive the data that is included within the paging message. Thus, a subsequent service request by one or more of these UEs is unnecessary to receive the data. In this manner, according to this example implementation, paging overhead may be reduced, e.g., by sending one paging message, which includes data, to a group of UEs that are members of the first slice-specific paging group. Signaling overhead may also be reduced in this example implementation, e.g., because data may be transmitted within one paging message to a group of UEs that are members of a particular slice-specific paging group, thus avoiding the need for a subsequent service request procedure and separate data transmission from the NW to each UE. Thus, in this example implementation, the UE may receive the data that is included directly within the paging message, and the UE does not initiate the service request procedure to the network (NW) (the service request procedure is unnecessary for this example implementation, since the UE directly receives the data via the paging message itself). Thus, in this case, if there is some common data (e.g., broadcast data associated with a particular service or application) to be delivered to at least some of the UEs that are members of the first slice-specific paging group, then the BS may elect to page these UEs through use of slice-specific grouped paging, e.g., by sending control information directed to a first slice-specific paging group, followed by a paging message that directly includes the data to be delivered to these UEs that are members of the first slice-specific paging group. Thus, for example, this second example implementation (providing the data directly within a paging message to a slice-specific paging group) may, for example, be particularly useful if there is some common data to be transmitted/broadcast to a plurality of UEs that are members of the same slice-specific paging group (e.g., data, associated with a particular service or application, that is to be broadcast to this group of UEs).

Figure 2:
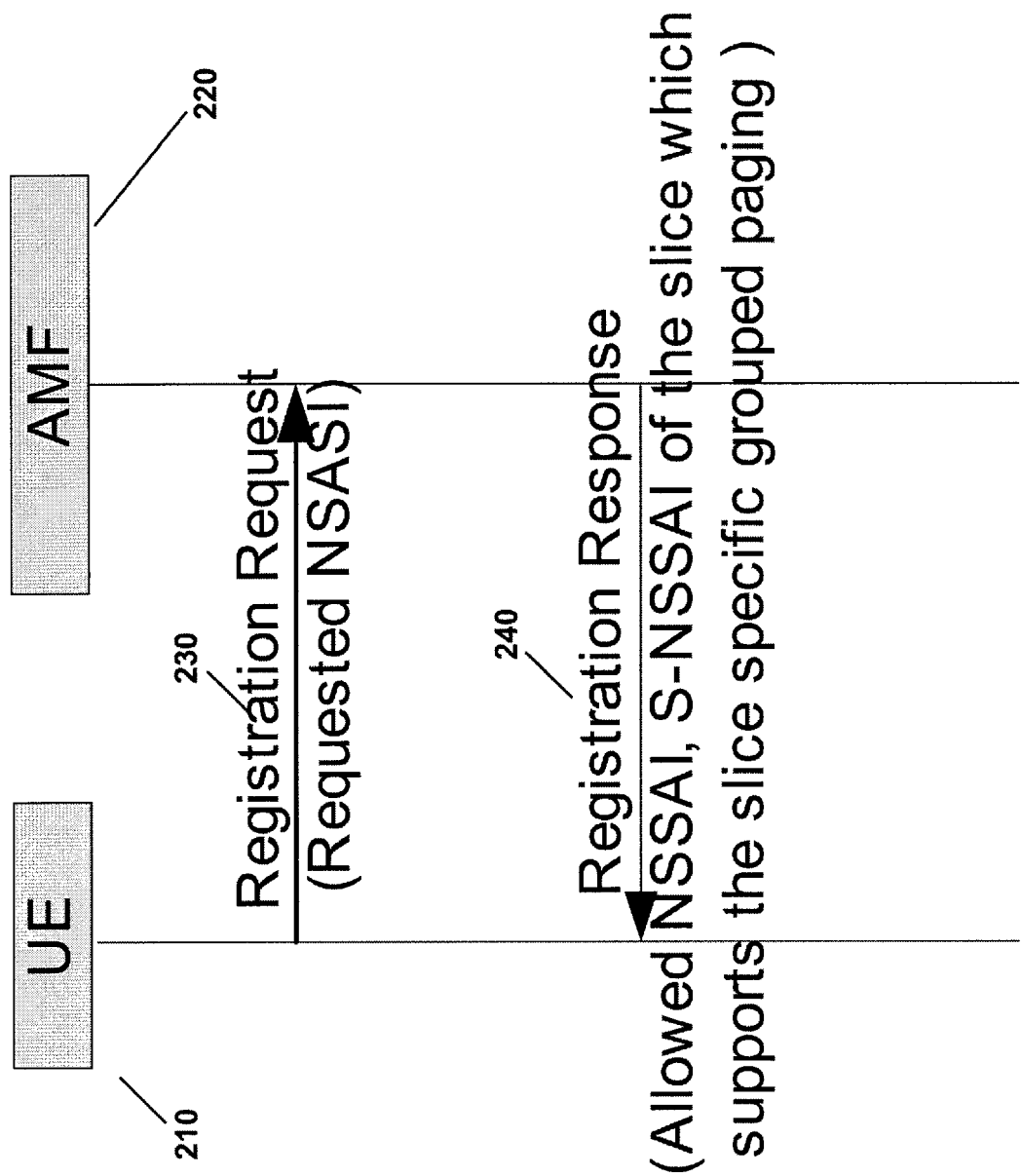
FIG. 2 is a diagram illustrating of registration procedure between a user device and a core network entity according to an example implementation.

FIG. 2 is a diagram illustrating of registration procedure between a user device and a core network entity according to an example implementation. As shown in FIG. 2, a registration procedure between a UE 210 and a core network entity (e.g., an Access and Mobility Management Function (AMF) 220 at the core network). At 230, the UE 210 may send a registration request including a group of one or more slice (network slice) identifiers (e.g., a NSSAI, which may indicate a group or vector of network slice identifiers) for which the UE is requesting support or requesting to join. At 240, the core network entity (AMF 220) may send a registration response to the UE 210 that includes an allowed group of network slice identifiers (e.g., the allowed NSSAI) and a slice identifier (e.g., S-NSSAI) of a network slice that supports slice-specific grouped paging.

Figure 3:
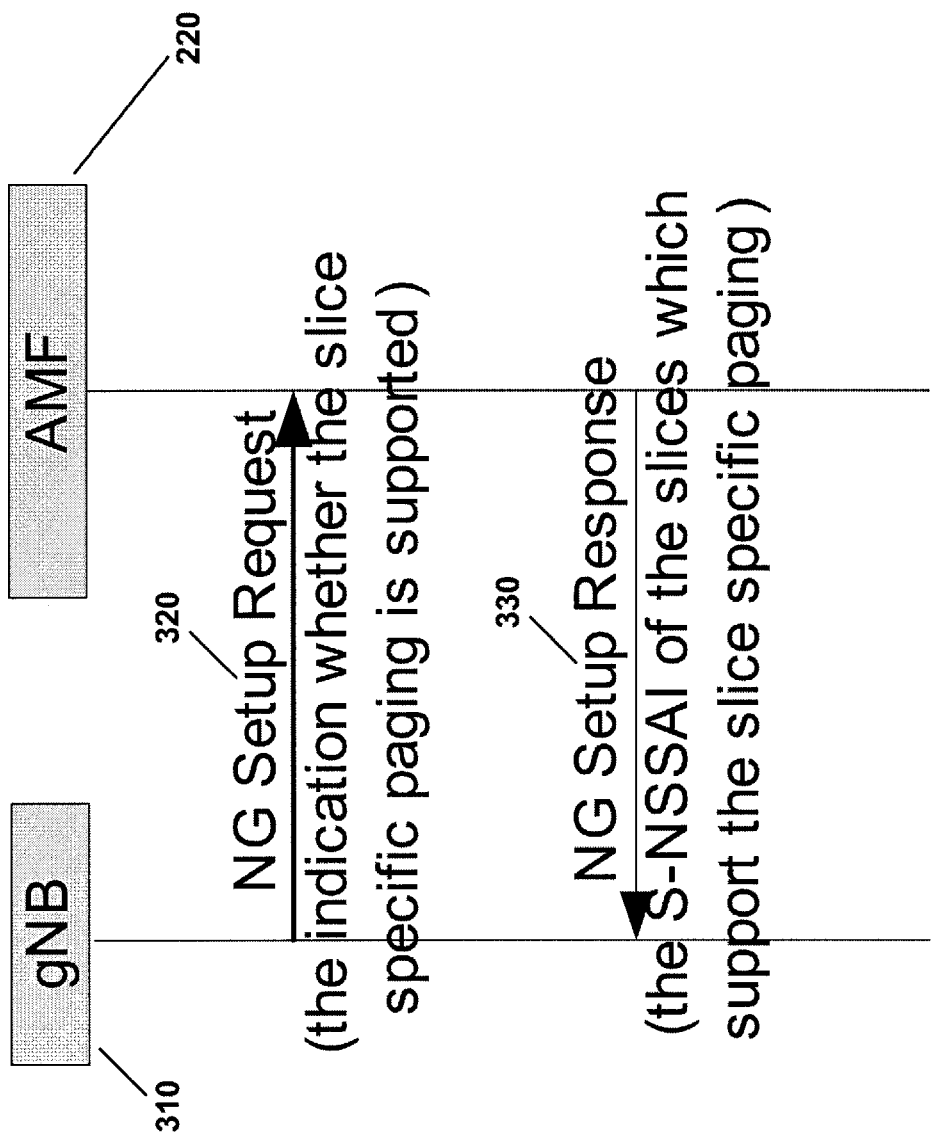
FIG. 3 is a diagram illustrating a setup procedure between a base station and a core network entity according to an example implementation.

FIG. 3 is a diagram illustrating a setup procedure between a base station and a core network entity according to an example implementation. As shown in FIG. 3, at 320, a BS (gNB) 310 may send a setup request to the core network entity (AMF 220) indicating that slice-specific grouped paging is supported by the BS 310. At 330, the AMF 220 may reply with a setup response that includes the slice identifiers (e.g., one or more S-NSSAIs) of network slices that support the slice-specific grouped paging. Thus, for example, a BS/gNB 310 may (at 320) send, to a core network entity (e.g., AMF), a request to support such slice-specific grouped paging, and (at 330) the core network entity/AMF 220 may identify to the BS 310 one or more network slices (e.g., each network slice identified by a slice identifier or S-NSSAI) for which the AMF 220/core network will support slice-specific grouped paging.

According to an example implementation, the UE, BS, and/or core network entity may be able to determine or derive a slice-specific paging group identifier (e.g., S-P-RNTI) for each slice specific paging group based on the corresponding slice identifier (e.g., based on the S-NSSAI) for the slice. For example, the S-P-RNTI may be determined as a subset of the corresponding S-NSSAI for a slice. Other techniques may be used to determine a slice-specific paging group identifier (e.g., S-P-RNTI) for one or more network slices. For example, the slice identifiers (e.g., S-NSSAI) for one or more slices may be used for a registration procedure of FIG. 2 and/or setup procedure of FIG. 3 with AMF 220/core network entity. Whereas, a BS may use the slice-specific paging group identifier (e.g., S-P-RNTI) for a group or slice to direct or address messages (e.g., downlink control information) to UEs that are members of a specific slice-specific paging group.

Figure 4:
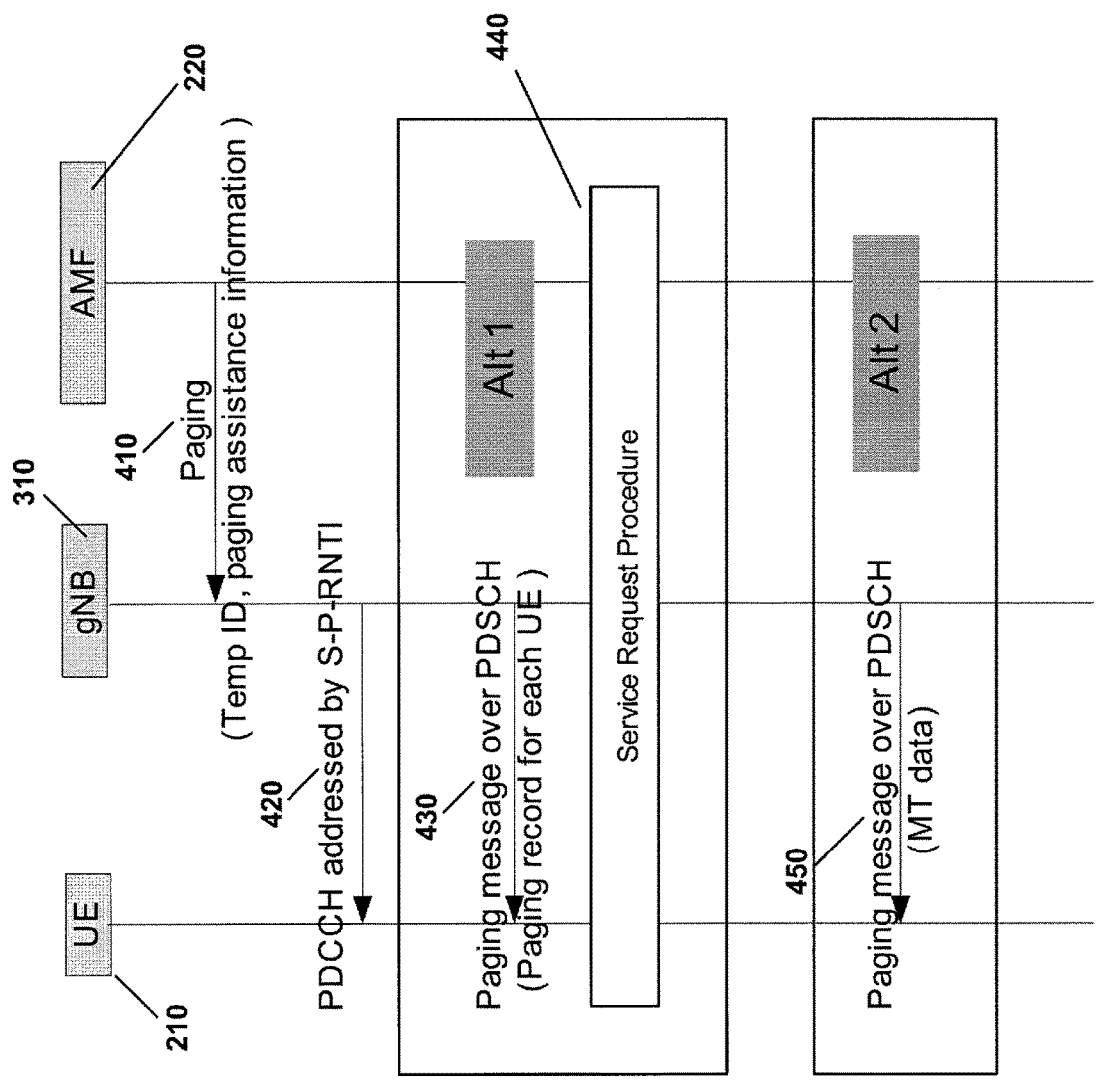
FIG. 4 is a diagram illustrating a paging and data transmission procedure according to an example implementation.

FIG. 4 is a diagram illustrating a paging and data transmission procedure according to an example implementation. As shown in FIG. 4, a BS (gNB) 310 may be in communication with a UE 210 and a core network entity (AMF 220). According to an example implementation, the procedure shown in FIG. 4 may be performed after one or both of the procedures illustrated in FIGS. 2 and 3 have been performed.

Referring to FIG. 4, AMF 220 may determine that there is DL data for UE 210. Therefore, at 410, AMF 220 may send a core network paging message to the BS 310, including an identifier (Temp ID) associated with a UE 210 (such as a temporary mobile subscriber ID (TMSI)), and paging assistance information. For example, the paging assistance information in a core network paging message may include one or more slice identifiers, e.g., one or more S-NSSAI and an indication the capability of UE to support the slice-specific grouped paging for these one or more network slices (e.g., by including these one or more slice identifiers within the core network paging message at 410, this may indicate that the identified UE 210 supports slice-specific grouped paging for these one or more identified slices). Thus, for example, the paging assistance information may include a slice identifier (e.g., S-NSSAI) associated with a service that triggered a paging procedure.

The BS 310 may receive a core network paging message for one or more UEs. For example, the BS 310 may receive a core network paging message for each of a plurality of UEs, and the BS 310 may determine (e.g., based on the paging assistance information indicating the slices for which the UE supports slice-specific grouped paging). And, for example, the BS 310 may determine that a plurality of these paged UEs are members of a first slice-specific paging group, for example. Therefore, in order to reduce paging overhead, and provide slice-specific paging control, the BS 310 may use slice-specific grouped paging to page each of these UEs and then transmit data to the UEs, that are members of the first slice-specific paging group. Thus, for example, UE 210 may be a member of a first slice-specific paging group, which may be identified by or associated with a first slice-specific paging group identifier (e.g., a first S-P-RNTI).

At 420, BS 310 may transmit downlink control information on a physical downlink control channel (PDCCH), where the downlink control information is directed (or addressed) to the first slice-specific paging group (including to the UE 210, which is a member of the first slice-specific paging group). For example, the downlink control information may be directed to the first slice-specific paging group by scrambling the downlink control information, or a portion thereof, with (or based on) the first slice-specific paging group identifier (e.g., scrambled based on the first S-P-RNTI). At 420, UE 210 may decode and descramble the downlink control information using the known first slice-specific paging group identifier (e.g., the first S-P-RNTI) that is associated with or used to identify the first slice-specific paging group. The downlink control information received by the UE may include, e.g., scheduling information for a paging message to be transmitted via a physical downlink shared channel (or data channel) (e.g., PDSCH) to members of the first slice-specific paging group.

UE 210 may then receive the paging message based on the scheduling information (e.g., via the resources indicated by the scheduling information). The UE 210 may then receive the data based on the paging message. There are two example techniques for UE 210 to receive data via a paging message. Each of these different techniques may be associated with a different paging message format. Thus, according to an example implementation, two different paging message formats may be used. Information (e.g., a control bit or flag) may be included within the downlink control information (at 420) that may indicate or identify the format of the paging message as either 1) a paging message format in which the paging message includes identities (e.g., TMSIs) of one or more UEs, which are members of the first slice-specific paging group, for which data will be transmitted after a service request procedure between the UE and NW, and 2) a paging message format in which the paging message directly includes data that is broadcast to UEs that are members of the first slice-specific paging group.

Thus, according to an example implementation, the UE may receive and decode and descramble the downlink control information using the slice-specific paging group identifier (e.g., S-P-RNTI) for the first slice-specific paging group, of which the UE is a member, to obtain the scheduling information for the paging message, and also to identify a paging message format for the paging message, e.g., based on control information that may be included in the downlink control information that may identify the paging message format.

According to an example implementation, in accordance with the two different paging message formats, there may be two different techniques or implementations that may be used to deliver or transmit data to one or more UEs that are members of a slice-specific paging group, including: 1) (Alt. 1 in FIG. 4) Transmitting or delivering data to a UE after a service request procedure, or 2) (Alt. 2 in FIG. 4) Directly including the data within the paging message (and thus, no service request procedure is required for delivery of the data to UEs that are members of the first slice-specific paging group). Further details are described below.

Thus, with reference to FIG. 4, for a first example implementation or alternative (Alt 1), at 430, the BS 310 sends a paging message over the PDSCH resources (resources indicated within the scheduling information within the downlink control information at 420) to the one or more UEs that are members of the first slice-specific paging group. At 430, the paging message includes a paging record (e.g., TMSI or other identifier) that identifies each of one or more UEs that are members of the first slice-specific paging group for which there is data for delivery. Each UE that receives the paging message may then check the paging message to determine if its identifier is included within the paging message (e.g., a presence of the UE's identifier or TMSI indicates that the BS has data for transmission to the UE indicated in the paging message). At 440, UE 210 (and any other UEs indicating by the paging message) may initiate a service request procedure to receive the data, e.g., which may include, by way of example, performing random access with the BS, establishing a connection with the NW, and receiving the data. In an illustrative example implementation, the first example paging procedure (Alt. 1) may be used, for example, where the NW may have different (or distinct or independent) data for delivery to each of multiple UEs that are members of a particular slice-specific paging group.

Also, with reference to FIG. 4, for a second example implementation or alternative (Alt 2), at 450, the BS 310 sends a paging message over the PDSCH resources (resources indicated within the scheduling information within the downlink control information at 420) to the one or more UEs that are members of the first slice-specific paging group. In this example implementation, the paging message at 450 includes mobile-terminating (MT) data (or data that is directed to or addressed to one or more UEs). Although not required, the UE 210 may receive the paging message at 450, and may detect its TMSI or UE identifier, or it may detect a slice identifier or slice-specific paging group identifier, e.g., indicating that the data included directly within a field or payload of the paging message at 450 is directed to the UE 210 or to any UE that is a member of the first (or identified) slice-specific paging group, for example. Or, alternatively, this data included within the paging message at 450 that is transmitted via resources indicated by the scheduling information (at 420) that was scrambled with the first slice-specific paging group identifier (e.g., scrambled based on the first S-P-RNTI), this may indicate that this data included within the paging message at 450 is directed to or addressed to UEs that are members of the first slice-specific paging group, for example. Thus, because the UE 210 (and other UEs who directly receive the data via paging message at 450) directly receive the data that is included within the paging message at 450, there is no need for UE 210 to initiate a service request procedure, thereby reducing signaling overhead. The second (Alt. 2) example implementation for paging and data delivery (e.g., using paging message 450 that includes the data) may, by way of illustrative example, be used to delivery broadcast data (e.g., same data) to be delivered to UEs that are members of the same slice-specific paging group.

Figure 5:
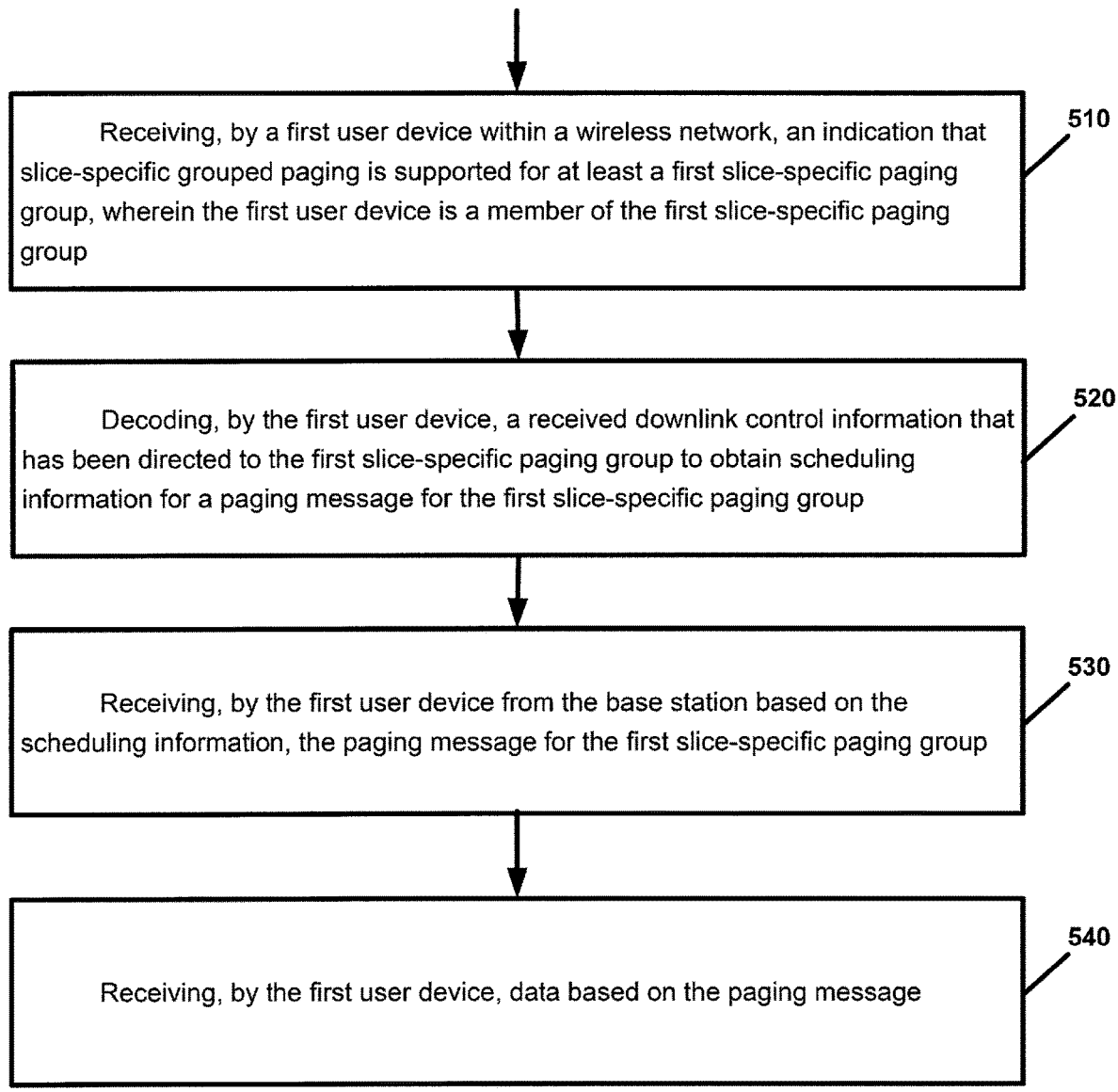
FIG. 5 is a flow chart illustrating operation of a user device according to an example implementation.

Example 1: FIG. 5 is a flow chart illustrating operation of a user device according to an example implementation. Operation 510 includes receiving, by a first user device within a wireless network, an indication that slice-specific grouped paging is supported for at least a first slice-specific paging group, wherein the first user device is a member of the first slice-specific paging group. Operation 520 includes decoding, by the first user device, a received downlink control information that has been directed to the first slice-specific paging group to obtain scheduling information for a paging message for the first slice-specific paging group. Operation 530 includes receiving, by the first user device from the base station based on the scheduling information, the paging message for the first slice-specific paging group. And, operation 540 includes receiving, by the first user device, data based on the paging message.

Example 2: According to an example implementation of example 1, wherein the downlink control information comprises: a first slice-specific paging group identifier associated with the first slice-specific paging group; and the scheduling information for the paging message for the first slice-specific paging group.

Example 3: According to an example implementation of any of examples 1-2, wherein the receiving an indication slice-specific grouped paging is supported for at least a first slice-specific paging group comprises: sending, by the first user device to a core network, a registration request to register with the network for a plurality of slice identifiers; receiving, by the first user device, a registration response from the core network indicating support for slice-specific grouped paging for at least a first slice identifier associated with the first slice-specific paging group; and deriving, by the first user device, a first slice-specific paging group identifier associated with the first slice-specific paging group based on the first slice identifier; and wherein the downlink control information includes the scheduling information for the paging message for the first slice-specific paging group and the first slice-specific paging group identifier associated with the first slice-specific paging group.

Example 4: According to an example implementation of any of examples 1-3, wherein the paging message includes a paging record that identifies the first user device; and wherein the receiving, by the first user device, data based on the paging message comprises initiating, by the first user device, a service request procedure to obtain the data in response to receiving the paging message that identifies the first user device.

Example 5: According to an example implementation of any of examples 1-4, wherein the paging message includes data therein that is broadcast to member user devices of the first slice-specific paging group including the first user device; and wherein the receiving, by the first user device, data based on the paging message comprises receiving the data included within the paging message.

Example 6: According to an example implementation of any of examples 1-5, wherein the received downlink control information that has been directed to the first slice-specific paging group further comprises: control information indicating a paging format of the paging message as either: 1) a first paging format in which the paging message includes identities of one or more user devices, which are members of the first slice-specific paging group, for which data will be transmitted after a service request procedure; and 2) a second paging format in which the paging message directly includes data that is broadcast to user devices that are members of the first slice-specific paging group including the first user device.

Example 7: According to an example implementation, apparatus may include means for performing a method of any of examples 1-6.

Example 8: An apparatus comprising at least one processor and at least one memory including computer instructions that, when executed by the at least one processor, cause the apparatus to perform a method of any of examples 1-6.

Example 9: An apparatus comprising a computer program product including a non-transitory computer-readable storage medium and storing executable code that, when executed by at least one data processing apparatus, is configured to cause the at least one data processing apparatus to perform a method of any of examples 1-6.

Figure 6:
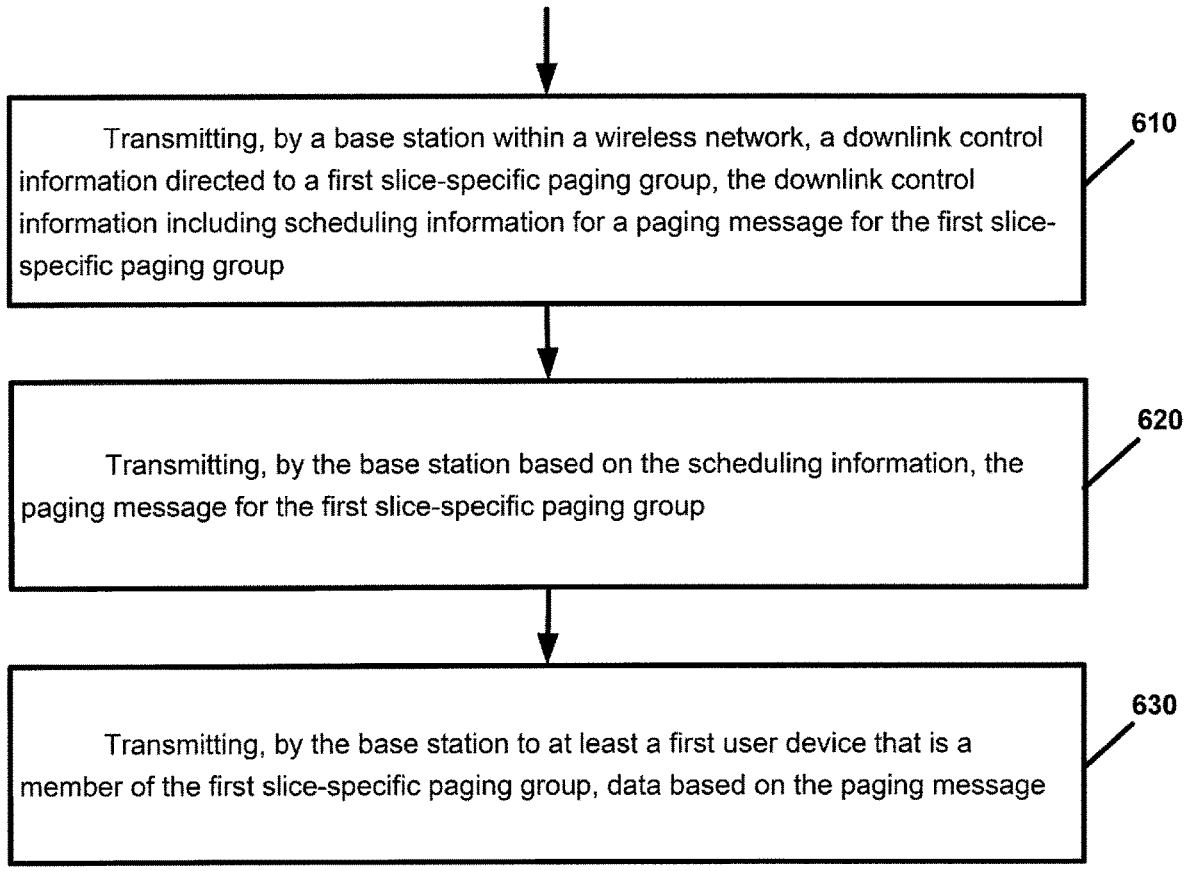
FIG. 6 is a flow chart illustrating operation of a base station according to an example implementation.

Example 10: FIG. 6 is a flow chart illustrating operation of a base station according to an example implementation. Operation 610 includes transmitting, by a base station within a wireless network, a downlink control information directed to a first slice-specific paging group, the downlink control information including scheduling information for a paging message for the first slice-specific paging group. Operation 620 includes transmitting, by the base station based on the scheduling information, the paging message for the first slice-specific paging group. And, operation 630 includes transmitting, by the base station to at least a first user device that is a member of the first slice-specific paging group, data based on the paging message.

Example 11: According to an example implementation of example 10, further comprising: transmitting, by the base station to a core network, a setup request including an indication that the base station supports slice-specific grouped paging; and receiving, by the base station from the core network, a setup response including an indication by the core network of support for slice-specific grouped paging for at least the first slice-specific paging group, wherein at least the first user device is a member of the first slice-specific paging group.

Example 12: According to an example implementation of any of examples 10-11, further comprising receiving, by the base station from the core network, a core network paging message that includes an identifier associated with the first user device and paging assistance information including a slice identifier associated with a service that triggered a paging procedure.

Example 13: According to an example implementation of any of examples 10-12, wherein the downlink control information comprises a first slice-specific paging group identifier associated with the first slice-specific paging group; and the scheduling information for the paging message for the first slice-specific paging group.

Example 14: According to an example implementation of any of examples 10-13, wherein the receiving, by the base station from the core network, a setup response including an indication by the core network of support for slice-specific grouped paging for at least the first slice-specific paging group comprises: receiving, by the base station from the core network, a setup response including a first slice identifier associated with the first slice-specific paging group to indicate support by the core network for slice-specific grouped paging for at least the first slice-specific paging group, wherein a first slice-specific paging group identifier, associated with the first slice-specific paging group, can be derived based on the first slice identifier; and wherein the downlink control information comprises: the first slice-specific paging group identifier associated with the first slice-specific paging group; and the scheduling information for the paging message for the first slice-specific paging group.

Example 15: According to an example implementation of any of examples 10-14, wherein the paging message includes a paging record that identifies the first user device; wherein the transmitting, by the base station to at least the first user device, data based on the paging message comprises transmitting by the base station, in response to a service request procedure initiated by the first user device, data to the first user device.

Example 16: According to an example implementation of any of examples 10-15, wherein the paging message includes data therein that is broadcast to user devices that are members of the first slice-specific paging group including the first user device; and wherein the transmitting, by the base station to at least the first user device, data based on the paging message comprises transmitting by the base station, the data included directly within the paging message.

Example 17: According to an example implementation of any of examples 10-16, wherein the downlink control information directed to the first slice-specific paging group further comprises: control information indicating a paging format of the paging message as either: 1) a first paging format in which the paging message includes identities of one or more user devices, which are members of the first slice-specific paging group, for which data will be transmitted after a service request procedure; and 2) a second paging format in which the paging message directly includes data that is broadcast to user devices that are members of the first slice-specific paging group including the first user device.

Example 18: An apparatus comprising means for performing a method of any of examples 10-17.

Example 19: An apparatus comprising at least one processor and at least one memory including computer instructions that, when executed by the at least one processor, cause the apparatus to perform a method of any of examples 10-17.

Example 20: An apparatus comprising a computer program product including a non-transitory computer-readable storage medium and storing executable code that, when executed by at least one data processing apparatus, is configured to cause the at least one data processing apparatus to perform a method of any of examples 10-17.

Figure 7:
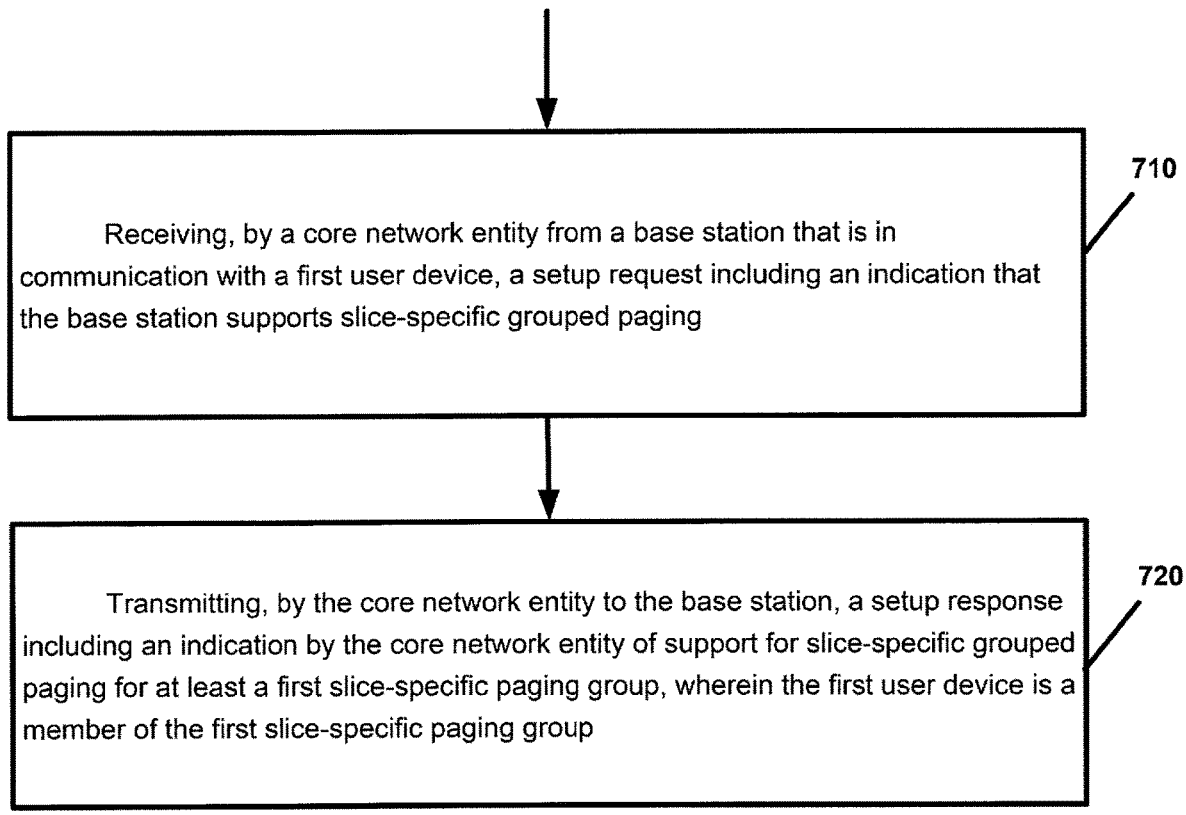
FIG. 7 is a flow chart illustrating operation of a core network entity according to an example implementation.

Example 21: FIG. 7 is a flow chart illustrating operation of a core network entity according to an example implementation. Operation 710 includes receiving, by a core network entity from a base station that is in communication with a first user device, a setup request including an indication that the base station supports slice-specific grouped paging. Operation 720 includes transmitting, by the core network entity to the base station, a setup response including an indication by the core network entity of support for slice-specific grouped paging for at least a first slice-specific paging group, wherein the first user device is a member of the first slice-specific paging group.

Example 22: According to an example implementation of example 21, and further comprising transmitting, by the core network entity to the base station, a core network paging message that includes an identifier associated with the first user device.

Example 23: According to an example implementation of any of examples 21-22, and further comprising: receiving, by the core network entity from the first user device, a registration request; and transmitting, by the core network entity to the first user device, a registration response including an indication by the core network entity of support for slice-specific grouped paging for at least the first slice-specific paging group.

Example 24: According to an example implementation of any of examples 21-23, wherein the core network paging message further comprises paging assistance information including a slice identifier associated with a service that triggered a paging procedure.

Example 25: An apparatus comprising means for performing a method of any of examples 21-24.

Example 26: An apparatus comprising at least one processor and at least one memory including computer instructions that, when executed by the at least one processor, cause the apparatus to perform a method of any of examples 21-24.

Example 27: An apparatus comprising a computer program product including a non-transitory computer-readable storage medium and storing executable code that, when executed by at least one data processing apparatus, is configured to cause the at least one data processing apparatus to perform a method of any of examples 21-24.

Figure 8:
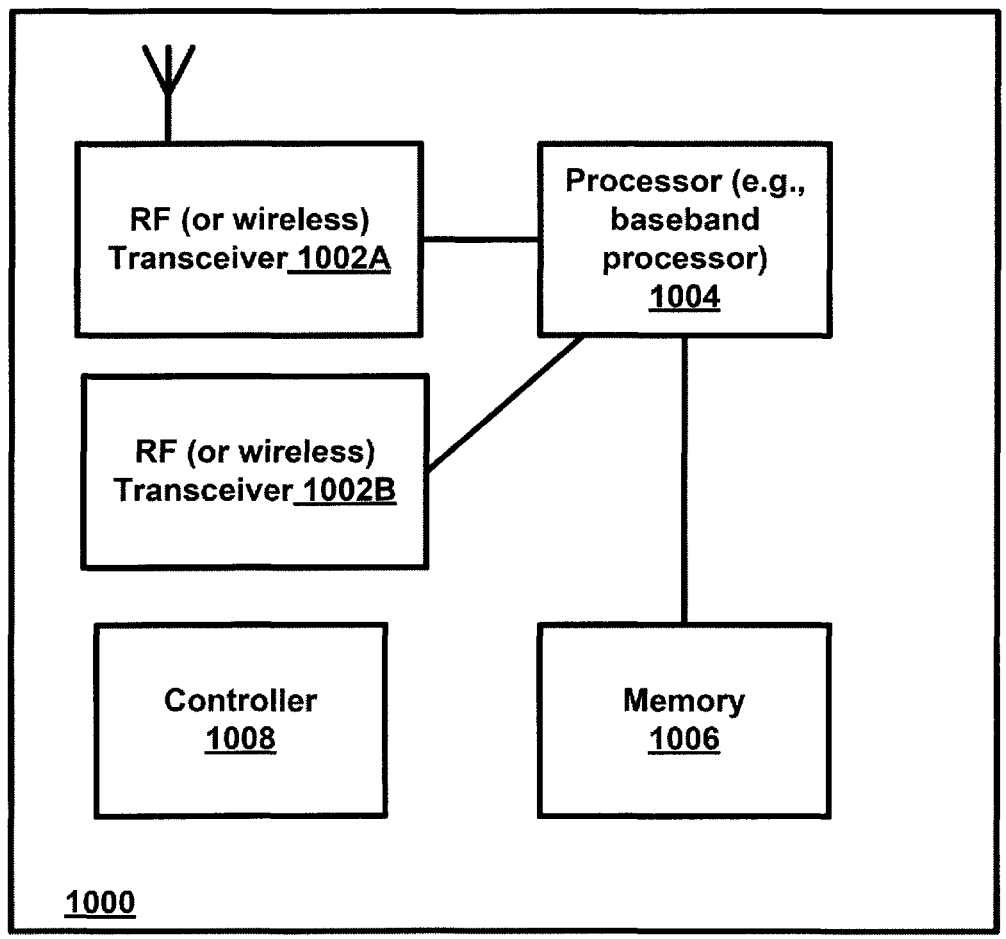
FIG. 8 is a block diagram of a node or wireless station (e.g., base station/access point or mobile station/user device) according to an example implementation.

FIG. 8 is a block diagram of a wireless station (e.g., AP, BS, eNB, UE or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 8, a controller (or processor) 1008 may execute software and instructions, and may provide overall control for the station 1000, and may provide control for other systems not shown in FIG. 8, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A first user device apparatus comprising:
   at least one processor; and
   at least one non-transitory memory including computer program code, the at least one memory and the computer program code configured, with the at least one processor, to cause the first user device to perform the following:
   receive, within a wireless network, an indication that slice-specific grouped paging is supported for at least a first slice-specific paging group, wherein the first user device is a member of the first slice-specific paging group;
   decode received downlink control information directed to the first slice-specific paging group to obtain scheduling information for a paging message for the first slice-specific paging group;
   derive a first slice-specific paging group identifier associated with the first slice-specific paging group from a subset of bits of a first slice identifier associated with a service;
   determine a paging format for which data is transmitted during the decoding of the downlink control information using the derived first slice-specific paging group identifier, wherein the received downlink control information indicates the paging format of the paging message;
   receive from a base station based on the scheduling information, the paging message for the first slice-specific paging group, wherein the paging message for the first slice-specific paging group is addressed using the first slice-specific paging group identifier;
   determine a data processing procedure to receive the data based on the determined paging format, the data processing procedure comprising at least one of:
      identifying a device identifier within a paging record included within the paging message, and initiating a service request procedure prior to receiving the data, the service request procedure comprising performing random access with the base station, the data being distinct for the first user device; or
      receiving the data directly within the paging message as a data payload within the paging message; and
   receive the data based on the paging message and based on the data processing procedure.

2. The apparatus of claim 1, wherein the downlink control information comprises:
   the first slice-specific paging group identifier associated with the first slice-specific paging group; and
   the scheduling information for the paging message for the first slice-specific paging group.

3. The apparatus of claim 1, wherein the reception of the indication that slice-specific grouped paging is supported for at least the first slice-specific paging group comprises the following performed with the first user device:
   send, to a core network, a registration request to register with the core network for a plurality of slice identifiers;
   receive a registration response from the core network indicating support for slice-specific grouped paging for at least the first slice identifier associated with the first slice-specific paging group; and the deriving of the first slice-specific paging group identifier associated with the first slice-specific paging group based on the first slice identifier;

wherein the downlink control information includes the scheduling information for the paging message for the first slice-specific paging group and the first slice-specific paging group identifier associated with the first slice-specific paging group.

4. The apparatus of claim 1, wherein the paging message includes the paging record that identifies the first user device;

wherein the reception of the data based on the paging message comprises:

the identifying of the device identifier within the paging record;

the initiating of the service request procedure following the identifying of the device identifier within the paging record; and the receiving of the data following the initiating of the service request procedure.

5. The apparatus of claim 1, wherein the paging message includes the data payload for member user devices of the first slice-specific paging group including the first user device; and wherein the reception of the data based on the paging message comprises: receive the data payload included within the paging message.

6. The apparatus of claim 1, wherein the received downlink control information directed to the first slice-specific paging group indicates the paging format of the paging message as either:

a first paging format in which the paging message includes identities of one or more user devices, which are members of the first slice-specific paging group including the first user device, for which the distinct data is transmitted after the service request procedure; or a second paging format in which the paging message directly includes common data that is broadcast to user devices that are members of the first slice-specific paging group including the first user device.

7. A base station apparatus comprising:

at least one processor; and at least one non-transitory memory including computer program code, the at least one memory and the computer program code configured, with the at least one processor, to cause the base station to perform the following:

generate downlink control information, the downlink control information indicating a paging format of a paging message for which data is transmitted;

transmit, within a wireless network, the downlink control information directed to a first slice-specific paging group, the downlink control information including scheduling information for the paging message for the first slice-specific paging group;

derive a first slice-specific paging group identifier associated with the first slice-specific paging group from a subset of bits of a first slice identifier associated with a service, wherein the paging format is indicated with the first slice-specific paging group identifier;

transmit, based on the scheduling information, the paging message for the first slice-specific paging group, wherein the paging message for the first slice-specific paging group is addressed using the first slice-specific paging group identifier;

wherein the paging message comprises an indication of a data processing procedure for transmission of the data, the data processing procedure comprising at least one of:

identification of a device identifier within a paging record included within the paging message, and initiation of a service request procedure prior to transmitting the data, the service request procedure comprising performing random access with a first user device, the data being distinct for the first user device; or transmitting the data directly within the paging message as a data payload within the paging message; and transmit, to at least the first user device that is a member of the first slice-specific paging group, the data based on the paging message and based on the data processing procedure.

8. The apparatus of claim 7, wherein the at least one memory and the computer program code are further configured to, with the at least one processor, cause the base station to:

transmit, to a core network, a setup request including an indication that the base station supports slice-specific grouped paging; and receive, from the core network, a setup response including an indication of the core network of support for slice-specific grouped paging for at least the first slice-specific paging group, wherein at least the first user device is a member of the first slice-specific paging group.

9. The apparatus of claim 8, wherein the at least one memory and the computer program code are further configured to, with the at least one processor, cause the base station to:

receive, from the core network, a core network paging message that includes an identifier associated with the first user device that triggered a paging procedure, and paging assistance information including the first slice identifier associated with the service.

10. The apparatus of claim 8, wherein the reception of the setup response including the indication of the core network of support for slice-specific grouped paging for at least the first slice-specific paging group comprises the following performed with the base station:

receive, from the core network, the setup response including the first slice identifier associated with the first slice-specific paging group to indicate support of the core network for slice-specific grouped paging for at least the first slice-specific paging group;

wherein the first slice-specific paging group identifier, associated with the first slice-specific paging group, can be derived based on the first slice identifier; and wherein the downlink control information comprises: the first slice-specific paging group identifier associated with the first slice-specific paging group.

11. The apparatus of claim 7, wherein the at least one memory and the computer program code are further configured to, with the at least one processor, cause the base station to:

scramble the downlink control information with the first slice-specific paging group identifier;

wherein the downlink control information is directed to the first slice-specific paging group using the first slice-specific paging group identifier following the scrambling of the downlink control information with the first slice-specific paging group identifier.

12. The apparatus of claim 7, wherein the paging message includes the paging record that identifies the first user device with a device identifier of the first user device, the paging record configured to be used with the first user device to identify the device identifier of the first user device within the paging record;
  wherein the transmission of the data based on the paging message comprises:
    transmit, in response to the service request procedure initiated with the first user device, the data to the first user device.

13. The apparatus of claim 7, wherein the paging message includes the data payload for user devices that are members of the first slice-specific paging group including the first user device; and
  wherein the transmission of the data based on the paging message comprises:
    transmit the data payload included directly within the paging message.

14. The apparatus of claim 7, wherein the downlink control information directed to the first slice-specific paging group indicates the paging format of the paging message as either:
  a first paging format in which the paging message includes identities of one or more user devices, which are members of the first slice-specific paging group including the first user device, for which the distinct data is transmitted after the service request procedure; or
  a second paging format in which the paging message directly includes common data that is broadcast to user devices that are members of the first slice-specific paging group including the first user device.

15. The apparatus of claim 1, wherein the first slice-specific paging group identifier is a slice paging radio network temporary identifier.

* * * * *